United States Patent
Solana et al.

(10) Patent No.: US 9,994,400 B2
(45) Date of Patent: Jun. 12, 2018

(54) CONVEYORS FOR SORTING PRODUCTS

(71) Applicant: Wal-Mart Stores, Inc., Bentonville, AR (US)

(72) Inventors: Jessica L. Solana, Bentonville, AR (US); Mustafa A. Harcar, Centerton, AR (US); Craig J. Stevens, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days. days.

(21) Appl. No.: 15/487,067

(22) Filed: Apr. 13, 2017

(65) Prior Publication Data
US 2017/0297828 A1    Oct. 19, 2017

Related U.S. Application Data

(60) Provisional application No. 62/322,416, filed on Apr. 14, 2016.

(51) Int. Cl.
*B65G 47/53* (2006.01)
*B07C 3/08* (2006.01)
*B65G 47/57* (2006.01)

(52) U.S. Cl.
CPC ............... *B65G 47/53* (2013.01); *B07C 3/08* (2013.01); *B65G 47/57* (2013.01); *B65G 2207/18* (2013.01)

(58) Field of Classification Search
CPC ....... B65G 13/10; B65G 47/46–47/506; B65G 47/5104; B65G 47/53; B65G 47/54; B65G 47/57; B65G 47/643; B65G 47/646; B65G 47/647; B65G 47/71; B65G 2207/18; B07C 3/08
See application file for complete search history.

(56) References Cited

U.S. PATENT DOCUMENTS 3,358,831 A * 12/1967 Cothrell .................. B27L 5/002
                                                    198/347.4
3,580,141 A *  5/1971 Richter .................. B65H 29/16
                                                    198/341.05

(Continued)

FOREIGN PATENT DOCUMENTS

GB      2259900      3/1993
WO      2014191162   12/2014

OTHER PUBLICATIONS

PCT; App. No. PCT/US2017/027313; International Search Report and Written Opinion dated Jul. 13, 2017.

*Primary Examiner* — Leslie A Nicholson, III
*Assistant Examiner* — Keith R Campbell
(74) *Attorney, Agent, or Firm* — Fitch, Even, Tabin & Flannery LLP

(57) ABSTRACT

Systems and methods for sorting products using conveyors having multiple inputs and multiple outputs include first product conveyors vertically stacked relative to one another, second product conveyors vertically stacked relative to one another, and transfer conveyors connecting the first and second product conveyors. The transfer conveyors permit products travelling on the first product conveyors to be transferred from the first product conveyors onto the second product conveyors by way of the products being first transferred from the first product conveyors onto the transfer conveyors and then from the transfer conveyors onto the second product conveyors.

22 Claims, 3 Drawing Sheets

(56) References Cited

U.S. PATENT DOCUMENTS

| | | | |
|---|---|---|---|
| 4,811,830 A * | 3/1989 | Felder | B65G 1/0485 198/361 |
| 5,582,324 A | 12/1996 | Pippin | |
| 5,988,356 A | 11/1999 | Bonnet | |
| 6,005,211 A | 12/1999 | Huang | |
| 6,471,039 B1 * | 10/2002 | Bruun | B65G 37/02 198/577 |
| 6,557,724 B1 * | 5/2003 | LeCroy | B65G 47/52 198/435 |
| 6,644,458 B1 * | 11/2003 | Edslev-Christensen | B65G 47/50 198/370.01 |
| 7,331,440 B2 * | 2/2008 | Lafontaine | B65G 1/08 198/347.4 |
| 8,376,118 B2 | 2/2013 | Layne | |
| 9,022,201 B1 * | 5/2015 | Hyman | B65G 47/71 198/369.1 |
| 2003/0141226 A1 | 7/2003 | Morikawa | |
| 2003/0168313 A1 | 9/2003 | Hiroki | |
| 2004/0073333 A1 | 4/2004 | Brill | |
| 2011/0029127 A1 | 2/2011 | Stemmle | |
| 2014/0346008 A1 * | 11/2014 | Hoynash | B65G 1/04 198/347.1 |
| 2015/0001137 A1 | 1/2015 | Layne | |

\* cited by examiner

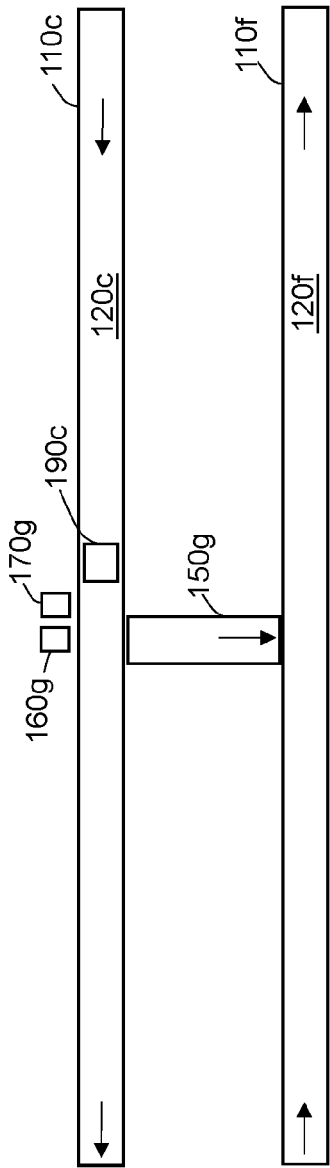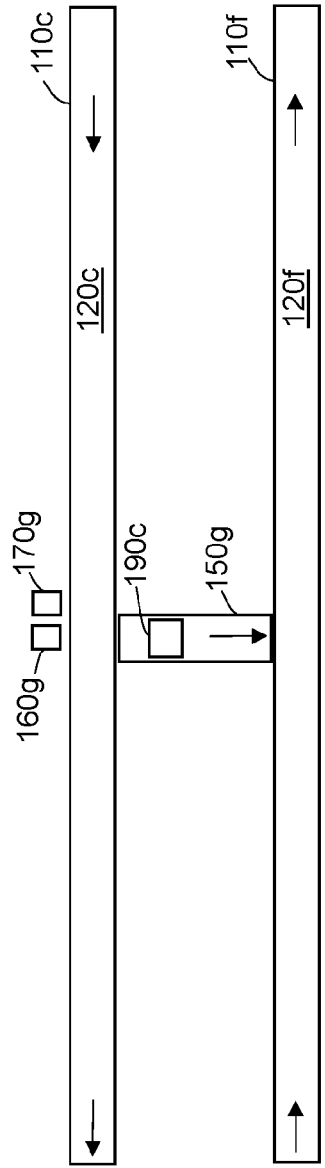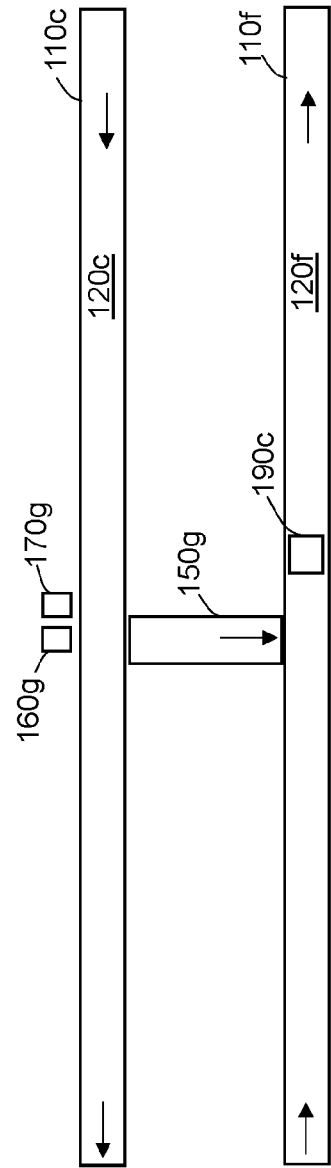

CONVEYORS FOR SORTING PRODUCTS

CROSS-REFERENCE TO RELATED APPLICATION

This application claims the benefit of U.S. Provisional Application No. 62/322,416, filed Apr. 14, 2016, which is incorporated herein by reference in its entirety.

TECHNICAL FIELD

This invention relates generally to sorting products using conveyors and, in particular, to systems and methods for sorting products using conveyors having multiple inputs and multiple outputs.

BACKGROUND

Retailers routinely transport products in packages to sorting facilities, where the packages are sorted according to various factors (e.g., destination, size of package, storage requirements, etc.) to form groups that are then delivered to their destinations. Since the packages typically come to the sorting facilities from multiple sources and are intended for multiple destinations, conventional sorting systems have multiple inputs and outputs in an attempt to expedite processing speed. Such conventional conveyor-based sorting systems typically rely on a merge and sort point. For example, in order to sort packages coming from multiple origins to multiple destinations, a merge and sort is used such that packages traveling on multiple conveyor lines would be merged to one line and are then sorted to multiple output lines.

One problem with such conventional sorting systems is that a merge and sort design creates a bottleneck when multiple conveyor lines are fed into one merge point and a single line before being sorted. As such, the throughput of such systems is capped at the speed of the merge process of the multiple lines and limits the throughput capabilities of the individual input and output lines. In addition, a merge and sort conveyor system creates a single point of failure at the merge point, such that if the merge or sort point experiences downtime, for example, as a result of a malfunction or a repair, the entire system goes down. In addition, conventional merge and sort systems often have bulky footprints requiring a single line sorter and a large merge bed, taking up a large section of the warehouse footprint, resulting in sub-optimal utilization of the space available above or below the sorter.

BRIEF DESCRIPTION OF THE DRAWINGS

Disclosed herein are embodiments of systems, apparatuses, and methods pertaining to systems and methods are provided for sorting products using conveyors having multiple inputs and multiple outputs. This description includes drawings, wherein:

FIG. 2A top view of two of the conveyors when a product traveling on a product advancement surface of a first conveyor approaches the transfer conveyor;

FIG. 2B is the same view as in FIG. 2A, but showing the product traveling on the transfer conveyor;

FIG. 2C is the same view as in FIG. 2B, but showing the product traveling on a product advancement surface of the second conveyor after being transferred from the first conveyor to the second conveyor via the transfer conveyor.

Figure 1:
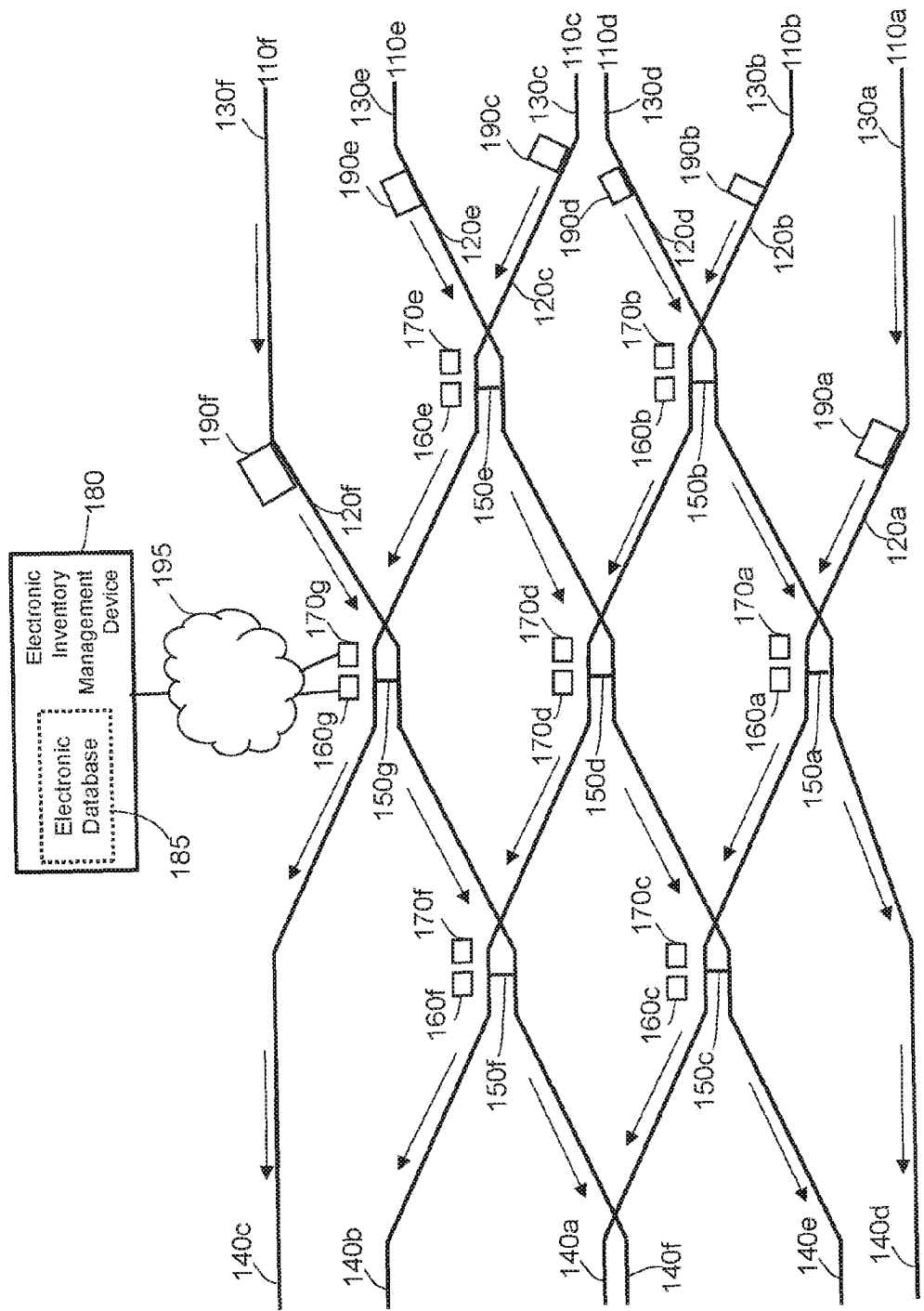
FIG. 1 is a diagram of a system of sorting products using conveyors having multiple inputs and multiple outputs in accordance with some embodiments.

Elements in the figures are illustrated for simplicity and clarity and have not been necessarily drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for sorting products using conveyors having multiple inputs and multiple outputs.

In one embodiment, a conveyor system for sorting products includes: first product conveyors vertically stacked relative to one another and each having a product advancement surface configured to move in at least a first direction; second product conveyors vertically stacked relative to one another and each having a product advancement surface configured to move in at least a second direction different from the first direction; and transfer conveyors connecting the first and second product conveyors, the transfer conveyors configured to permit transfer a product between the first product conveyors and the second product conveyors; wherein at least one of the first product conveyors is connected by a plurality of transfer conveyors to a plurality of the second product conveyors to permit transfer of the product from the product advancement surface of the at least one of the first product conveyors to the product advancement surface of any one of the plurality of the second product conveyors.

In another embodiment, a method of sorting products includes: providing first product conveyors vertically stacked relative to one another and each having a product advancement surface configured to move in at least a first direction; providing a second product conveyors vertically stacked relative to one another and each having a product advancement surface configured to move in at least a second direction different from the first direction; providing transfer conveyors connecting the first and second product conveyors, the transfer conveyors configured to permit transfer a product between the first product conveyors and the second product conveyors; and connecting at least one of the first product conveyors by a plurality of transfer conveyors to a plurality of the second product conveyors to permit transfer of the product from the product advancement surface of the at least one of the first product conveyors to the product advancement surface of any one of the plurality of the second product conveyors.

FIG. 1 shows an embodiment of a conveyor system 100 for sorting products 190a-190f. The exemplary system 100 shown in FIG. 1 includes six conveyors 110a-110f having six products 190a-190f thereon, respectively, but it will be appreciated that the system 100 may include less conveyors (e.g., 4 or 2), or significantly more conveyors (e.g., 12, 24, 50, 100, or more) depending on the size of the sorting facility where the conveyor system 100 is installed, and depending on the number of products passing through the system 100. By the same token, while each conveyor 110a-110f is illustrated in FIG. 1 as having one product 190a-190f thereon, it will be appreciated that each of the conveyors 110a-110f may concurrently transport more than one product 190a-190f (e.g., dozens and/or hundreds of products, depending on the length of the conveyor). In addition, while this application refers to products 190a-190f and the sorting of products 190a-190f, it will be appreciated that the conveyor system 100 may be used to transport products that are retained in packages, boxes, and/or totes, and/or loose products that are not packaged. Further, the size of the products 190a-190f in FIG. 1 has been shown by way of example only, and it will be appreciated that the conveyors may transport many different products 190a-190f having many different sizes and shapes.

In the exemplary system 100 of FIG. 1, the conveyors 110a-110c are vertically stacked relative to one another. In other words, the product advancement surface 120c of the conveyor 110c is located above (and directly overlays) the product advancement surface 120b of the conveyor 110b, which is in turn located above (and directly overlays) the product advancement surface 120a of the conveyor 110a, while the product advancement surface 120f of the conveyor 110f is located above (and directly overlays) the product advancement surface 120e of the conveyor 110e, which is in turn located above (and directly overlays) the product advancement surface 120d of the conveyor 110d.

In the exemplary system 100 of FIG. 1, the conveyors 110a-110c (referred to herein as "the first product conveyors") each have a product advancement surface 120a-120c configured to move one or more products 190a-190c in one or more directions indicated by the arrows. Similarly, the conveyors 110d-110f (referred to herein as "the second product conveyors") each have a product advancement surface 120d-120f configured to move one or more products 190d-190f in one or more direction indicated by the arrows. As can be seen in FIG. 1, each product advancement surface 120a-120f includes one or more portions that are parallel to one or more portions of one or more of the other product advancement surfaces 120a-120f. In other words, the product advancement surface 120a includes several upwardly-sloping portions that are parallel to several upwardly-sloping portions of the product advancement surfaces 120b and 120c. While the system 100 in FIG. 1 includes half of the conveyors (i.e., 110a-110c) having product advancement surfaces (i.e., 120a-120c) moving some of products (i.e., 190a-190c) in one direction (i.e., upward), while half of the conveyors (i.e., 110d-110f) have product advancement surfaces (i.e., 120d-120f) moving some of the products (i.e., 190d-190f) in an opposite direction (i.e., downward), it will be appreciated that all of the conveyors 110a-110f of the system 100 may have product advancement surfaces 120a-120f that move all of the products 190a-190f in one direction (i.e., all upward or all downward).

Each of the conveyors 110a-110f of the exemplary system 100 of FIG. 1 includes an input 130a-130f, where respective ones of the products 190a-190f may be loaded after arriving at a sorting facility where the system 100 is implemented. In addition, each of the conveyors 110a-110f of the system 100 of FIG. 1 includes an output 140a-140f, where respective ones of the products 190a-190f may be unloaded (e.g., to go onto a truck for delivery to the next destination). Since the conveyors 110a-110f are vertically stacked, as shown in FIG. 1, the input 130c is located above and directly overlays the input 130b, which is in turn located above and directly overlays the input 130a, while the input 130f is located above and directly overlays the input 130e, which is in turn located above and directly overlays the input 130d. Similarly, as shown in FIG. 1, the output 140c is located above and directly overlays the output 130b, which is in turn located above and directly overlays the output 140a, while the output 140f is located above and directly overlays the output 140e, which is in turn located above and directly overlays the output 140d. In the exemplary system 100 illustrated in FIG. 1, as each conveyor 110a-110f extends from its respective input 130a-130f to its respective output 140a-140f, the product advancement surface 120a-120f of each conveyor 110a-110f includes at least one direction deviation from a horizontal surface to a sloped (i.e., upward- or downward-sloping) surface.

The product advancement surface 120a-120f of the conveyors 110a-110f may be comprised of a single conveyor belt surface, or may be instead comprised of a series of two or more independently movable conveyor belt surfaces. For example, in the exemplary system 100 shown in FIG. 1, the conveyor 110a may include seven independently movable conveyor belt surfaces (4 horizontal ones and 3 inclined ones), with each new conveyor belt surface beginning at the point of angular deviation of the product advancement surface 120a (i.e., from horizontal to inclined and from inclined to horizontal). In some embodiments, the inclined conveyor belt surfaces of the product advancement surface 120a-120e are inclined from about 15 to about 20 degrees, and in some aspects, from about 16 to about 18 degrees relative to the horizontal conveyor belt surfaces. The speed of the product advancement surface 120a-120f of the conveyors 110a-110f can be determined and set (e.g., 500 products per hour, 900 products per hour, 1000 products per hour, 1100 products (e.g., totes) per hour, etc.) depending on the size and throughput requirements of the sorting facility where the conveyor system 100 is installed. For example, the speed of the product advancement surface 120a-120f of the conveyors 110a-110f is from about 0.1 meters per second to about 2 meters per second in some aspects, from about 0.5 meters per second to about 1.5 meters per second in other aspects, and about 1 meter per second in other aspects. In some embodiments, one or more of such independently movable conveyor surfaces of the product advancement surface 120a may be configured to stop while one or more of the other independently movable conveyor sections of the product advancement surface 120a are permitted to move. The conveyors 110a-110f may be belt conveyors, chain conveyors, or the like and may have a continuous, uninterrupted product advancement surface 120a-120f, or may have a product advancement surface 120a-120f that includes one or more interruptions at the transitions between the distinct conveyor surfaces.

In the embodiment shown in FIG. 1, the system 100 further includes transfer conveyors 150a-150g connecting the first and second product conveyors 110a-110f and permitting for multiple transfer points where the products 190a-190f may be transferred between the first conveyors 110a-110c and second conveyors 110d-110f. Similarly to the product advancement surfaces 120a-120f of the conveyors 110a-110f, the transfer conveyors 150a-150g may be independently movable relative to one another. As such, one or more of the transfer conveyors 150a-150g may be stopped while another one or more of the transfer conveyors 150a-150g are permitted to move. It will be appreciated that each of the transfer conveyors 150a-150g may be movable in one direction only (e.g., to permit for product transfer from conveyor 110a to conveyor 110b but not vice versa), or may be movable in two directions (e.g., to permit for product transfer from conveyor 110a to conveyor 110b and from conveyor 110b to conveyor 110a).

In the exemplary system 100 of FIG. 1, the transfer conveyors 150a-150g are oriented in a direction perpendicular to the respective product advancement surfaces 120a-120f of the respective conveyors 110a-110f that the transfer conveyors 150a-150g interconnect. However, it will be appreciated that the transfer conveyors 150a-150g may be oriented in a direction that is not perpendicular (e.g., at a 30 degree, 60 degree, 120 degree, or 150 degree angle) relative to their respective product advancement surfaces 120a-120f.

As shown in FIG. 1, each of the first conveyors 110a-110c may be connected by one or more transfer conveyors 150a-150g to one or more second product conveyors 110d-110f to permit transfer of one or more of the products 190a-190f from one or more of the product advancement surfaces 120a-120c of one or more of the first conveyors 110a-110c to one or more of the product advancement surfaces 120d-120f of one or more of the second product conveyors 110d-110f. For example, in the exemplary system 100 of FIG. 1: the transfer conveyor 150a interconnects the first conveyor 110a with the second conveyor 110d; the transfer conveyor 150b interconnects the first conveyor 110b with the second conveyor 110d; the transfer conveyor 150c interconnects the first conveyor 110a with the second conveyor 110e; the transfer conveyor 150d interconnects the first conveyor 110b with the second conveyor 110e; the transfer conveyor 150e interconnects the first conveyor 110c with the second conveyor 110e; the transfer conveyor 150f interconnects the first conveyor 110b with the second conveyor 110f; and the transfer conveyor 150g interconnects the first conveyor 110c with the second conveyor 110f. It will be appreciated that the locations of the transfer conveyors 150a-150f in FIG. 1 are shown by way of example only, and that each of the conveyors 110a-110f may include more than one or two (e.g., 5, 10, 25, 50, 100, or more) transfer conveyors 150a-150g coupled thereto, depending on the length of the conveyors 110a-110f, and the throughput needs of a sorting facility where system 100 is implemented and the size of the system 100.

In the exemplary embodiment shown in FIG. 1, the transfer conveyors 150a-150g of the system 100 are positioned to connect the first conveyors 110a-110c with the second conveyors 110d-110f at the horizontal portions of the respective product advancement surfaces 120a-120f of each of the first conveyors 110a-110c and second conveyors 110d-110f. However, it will be appreciated that one or more of the transfer conveyors 150a-150f may be located at the inclined (upwardly or downwardly) portions of the product advancement surfaces 120a-120f.

In order to effectuate the transfers of the products 190a-190f between the conveyors 110a-110f, the exemplary system 100 illustrated in FIG. 1 includes a product transfer unit 160a-160g located at each respective transfer conveyor 150a-150g. For example, the product transfer unit 160a is located and configured to transfer the product 190a from the conveyor 110a to the conveyor 110d when the product 190a is located on or near the transfer conveyor 150a. In some embodiments, each of the product transfer units 160a may include a movable (e.g., reciprocating) arm configured to push the product 190a, a movable picker arm configured to lift, move, and set down the product 190a, a lift gate configured to obstruct and/or unobstruct a traveling path of the product 190a, and/or any other movable or stationary device that may obstruct, and/or contact, and/or otherwise affect the traveling path of the product 190a at a suitable time to divert the traveling path of the product 190a from the product advancement surface 120a of the conveyor 110a onto the surface of the transfer conveyor 150a, which in turn transfers the product 190a to the product advancement surface 120d of the conveyor 110d.

It will be appreciated that the product advancement surfaces 120a-120f of the conveyors 110a-110f and their respective transfer conveyors 150a-150g may be configured and oriented such that no physical manipulation of a product 190a-190f by the product transfer unit 160a-160f is required. For example, in some embodiments, the transfer conveyor 150a (and/or any other one of the conveyors 150b-150g) may have a movable conveyor surface which may be wirelessly or electrically activated by a control switch that is incorporated into, or in communication with the product transfer unit 160a, such that the activation of movement of the conveyor surface of the transfer conveyor 150a by the product transfer unit 160a (or by another electronic device of system 100) causes the product 190a to be transferred from conveyor 110a to conveyor 110d without the product transfer unit 160a directly contacting the product 190a.

In the exemplary system 100 shown in FIG. 1, the system 100 includes a product detection unit 170a-170g associated with, and in communication with each of the product transfer units 160a-160g and configured to detect the presence of and/or to identify a product 190a-190f as the product 190a-190f moves on the product advancement surface 120a-120f of a respective conveyor 110a-110f. The product detection unit 170a-170g of the exemplary system 100 may include one or more of a motion-detecting sensor, physical contact sensor, barcode-scanning sensor, photo sensor, video camera sensor, and/or a weight sensor, or the like. In some embodiments, each product detection unit 170a-170g may include a product scanning sensor configured to scan identifying indicia located on the products 190a-190f or on the packaging containing the products 190a-190f. The identifying indicia on the products 190a-190f that may be scanned by the product scanning sensor of a product detection unit 170a-170g may include, but is not limited to: two dimensional barcode, RFID, near field communication (NFC) identifiers, ultra-wideband (UWB) identifiers, Bluetooth identifiers, images, or other such optically readable, radio frequency detectable or other such code, or combination of such codes.

While in the exemplary system 100 shown in FIG. 1, the product transfer units 160a-160g and the product transfer units 160a-160g are illustrated as separate physical units, it will be appreciated that the product transfer units 160a-160g and the product detection units 170a-170f may be merged into one physical unit that performs both the function of detecting and/or identifying the products 190a-190f and the function of effectuating the transfer of the products 190a-190f from one of the conveyors 110a-110f to another.

In order to enable the product detection units 170a-170g and/or the product transfer units 160a-160g to determine which products 190a-190f to transfer from one conveyor 110a-110f to another, the exemplary system 100 of FIG. 1 includes an electronic inventory management device 180 configured to communicate with the product transfer units 160a-160g and/or the product detection units 170a-170g via a network 195. The electronic inventory management device 180 may be a stationary or portable electronic device, for example, a desktop computer, a laptop computer, a tablet, a mobile phone, or any other electronic device including a processor-based control circuit (i.e., control unit). In the embodiment of FIG. 1, the electronic inventory management device 180 is configured for data entry and processing as well as for communication with other devices of system 100 via the network 195 which may be a wide-area network (WAN), a local area network (LAN), a personal area network (PAN), a wireless local area network (WLAN), or any other internet or intranet network, or combinations of such networks. The electronic inventory management device 180 may be located at the same physical location as the conveyors 110a-110f, or may be located at a remote physical location relative to the conveyors 110a-110f.

Figure 3:
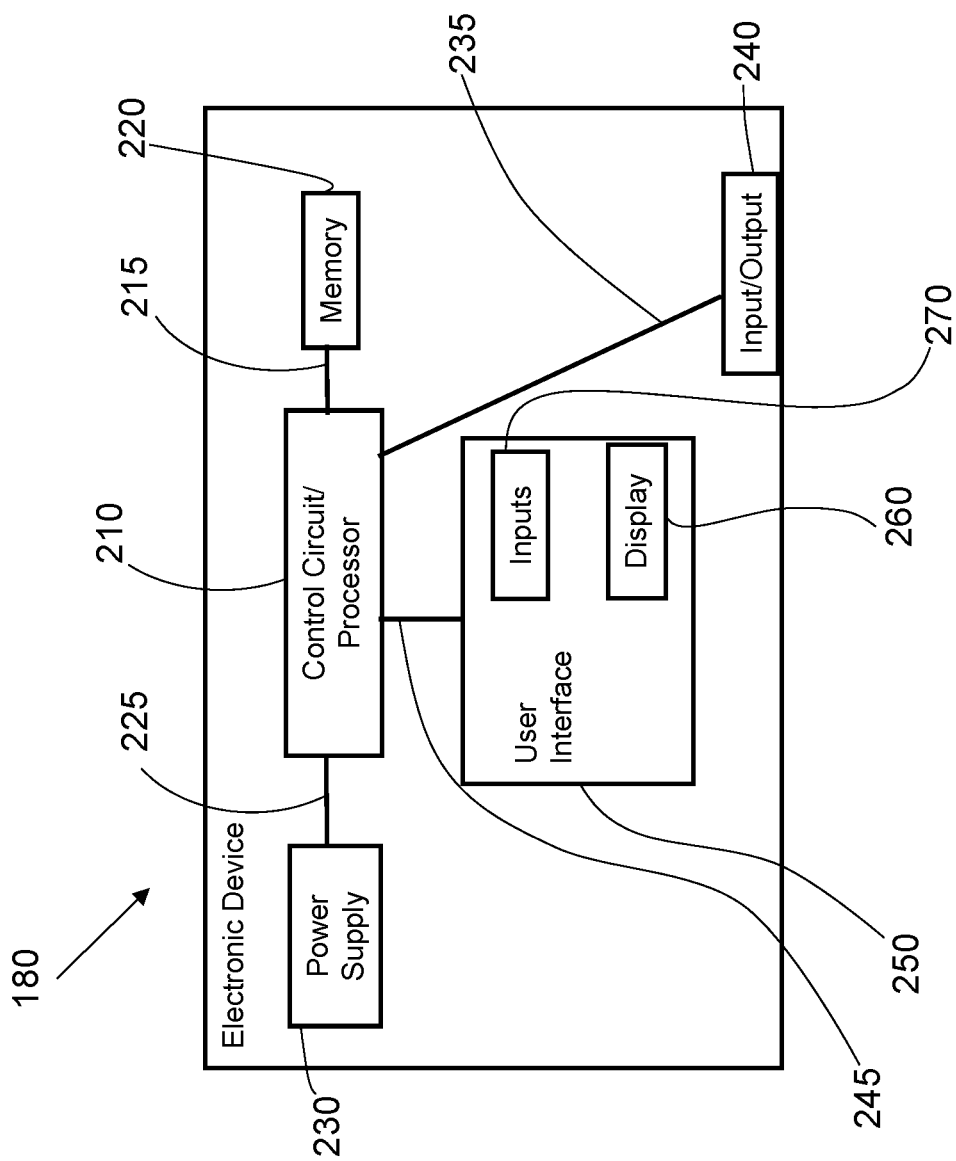
FIG. 3 is a functional diagram of an exemplary electronic inventory management device usable with the system of FIG. 1 in accordance with some embodiments.

With reference to FIG. 3, the electronic inventory management device 180 configured for use with exemplary systems and methods described herein may include a control circuit or control unit 210 including a processor (e.g., a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the electronic inventory management device 180 is also electrically coupled via a connection 235 to an input/output 240 that can receive signals from, for example, from an order processing server and/or from a product transfer unit 160a-160g and/or from a product detection unit 170a-170g (e.g., a signal indicating which product 190a-190f has been transferred from which conveyor 110a-110f and to which conveyor 110a-110f), and/or from another electronic device over the network 195. The input/output 240 of the electronic inventory management device 180 can also send signals to the product transfer units 160a-160g and/or the product detection units 170a-170g indicating which product 190a-190f to transfer from which conveyor 110a-110f and to which conveyor 110a-110f.

In the embodiment shown in FIG. 3, the processor-based control unit 210 of the electronic inventory management device 180 is electrically coupled via a connection 245 to a user interface 250, which may include a visual display or display screen 260 (e.g., LED screen) and/or button input 270 that provide the user interface 250 with the ability to permit an operator (e.g., worker at a product sorting facility where the system 100 is implemented) of the electronic inventory management device 180 to manually control the electronic inventory management device 180 by inputting commands via touch-screen and/or button operation and/or voice commands to, for example, to set one or more outputs 140a-140f where a product 190a should come off the conveyors 110a-110f, or to set one or more transfer conveyors 150a-150g where the product 190a should be transferred between the conveyors 110a-110f. For example, such manual control by an operator may be via the user interface 250 of the electronic inventory management device 180, via another electronic device of the operator, or via another user interface and/or switch, and may include an option to override the routing for the products 190a-190f on the conveyors 110a-110f preset by the electronic inventory management device 180 and to set new routing for the products 190a-190f on the conveyors 110a-110f. It will be appreciated that the performance of such functions by the processor-based control unit 210 of the electronic inventory management device 180 is not dependent on a human operator, and that the control unit 210 may be programmed to perform such functions without a human operator.

In some embodiments, the display screen 260 of the electronic inventory management device 180 is configured to display various graphical interface-based menus, options, and/or alerts that may be transmitted from and/or to the electronic inventory management device 180 in connection with various aspects of the sorting of the products 190a-190f on the conveyors 110a-110f. The inputs 270 of the electronic inventory management device 180 may be configured to permit an operator to navigate through the on-screen menus on the electronic inventory management device 180 and make changes and/or updates to the destinations and/or transfers of products 190a-190f between the conveyors 110a-110f. It will be appreciated that the display screen 260 may be configured as both a display screen and an input 270 (e.g., a touch-screen that permits an operator to press on the display screen 260 to enter text and/or execute commands.)

In the embodiment shown in FIG. 1, the electronic inventory management device 180 is coupled to an electronic (inventory management) database 185. The electronic inventory management device 180 and the electronic database 185 may be implemented as a single device in the same physical location as the conveyors 110a-110f of system 100 as shown in FIG. 1. It will be appreciated, however, that the electronic inventory management device 180 and the electronic database 185 may be separate physical devices, and may be located at different locations. In some embodiments, the electronic database 185 may be stored, for example, on non-volatile storage media (e.g., a hard drive, flash drive, or removable optical disk) internal or external to the electronic inventory management device 180, or internal or external to computing devices distinct from the electronic inventory management device 180. In some embodiments, the electronic database 185 may be cloud-based.

The exemplary electronic database 185 of FIG. 1 is configured to store electronic data associated with the products 190a-190f moving on the conveyors 110a-110f. Some exemplary electronic data that may be stored in the electronic database 185 includes but is not limited to: identification of the products 190a-190f (e.g., barcode and/or other identifying indicia); date of purchase of the products 190a-190f; price of purchase of the products 190a-190f; number of units of the products 190a-190f to be transported via the conveyors 110a-110f and/or packaged together for delivery; delivery destination pertaining to the products 190a-190f; delivery vehicle loading location and delivery vehicle scheduling information; and consumer information (e.g., name, address, payment information, etc.).

The exemplary electronic inventory management device 180 of the system 100 in FIG. 1 is configured to process relevant information in the electronic database 185 and to transmit a signal via a network 195 to one or more of the product detection units 170a-170g and/or to one or more of the product transfer units 160a-160g to enable the product detection units 170a-170g and/or the product transfer units 160a-160g to determine which of the products 190a-190f traveling on the product advancement surfaces 120a-120f of the conveyors 110a-110f are to be transferred from one of the conveyors 110a-110f to other conveyors 110a-110f.

In the embodiment shown in FIG. 1, as the products 190a-190f move on the product advancement surfaces 120a-120f of the conveyors 110a-110f, the spacing of the products 190a-190d is such that each product detection unit 170a-170g is permitted to detect and/or identify a first one of products 190a-190f moving on one of the conveyors 110a-110f and, if this first product 190a-190f is determined by the product detection unit 170a-170g to be marked for transfer to another conveyor 110a-110f, to cause the product to be transferred to another one of the conveyors 110a-110f via a respective one of the transfer conveyors 150a-150g in time to detect and/or identify a second one of products 190a-190f moving on that conveyor 110a-110-f. In other words, each product 190a-190f traveling on a product advancement surface 120a-120f and approaching a transfer conveyor 150a-150f is detected and/or scanned by a respective one of the product detection units 170a-170g to determine if the product 190a-190f is to be transferred to a product advancement surface 120a-120f of another conveyor 110a-110f.

FIGS. 2A-2C show a top view of the portions of the conveyors 110c and 110f of interconnected by the transfer conveyor 150g according to some embodiments in operation. With reference to FIG. 2A, as a product 190c traveling on the product advancement surface 120c of the first conveyor 110c in the direction indicated by the directional arrows approaches the transfer conveyor 150g, the product detection unit 170g detects the presence of the product 190c (e.g., via a motion sensor or other means described above) and scans the identifying indicia (e.g., barcode or other indicia described above) of the product 190c to identify the product 190c.

After the product 190c is identified, the product detection unit 170g may send a signal via the network 195 to the electronic inventory management device 180 indicating the presence of an identified product 190c at the product transfer conveyor 150g, after which the electronic inventory management device 180 may send a return signal to the product detection unit 170g and/or to the product transfer unit 160g indicating whether the product 190c is to be transferred from the conveyor 110c to the conveyor 110f. If the return signal sent by the electronic inventory management device 180 to the product detection unit 170g indicates that the product 190c is to be transferred, the product detection unit 170g may then send a signal to the product transfer unit 160g indicating that the product 190c is to be transferred, and the product transfer unit 160g either physically pushes, places, or redirects the product 190c onto the transfer conveyor 150g, or activates movement of the product advancement surface of the transfer conveyor 150g such that the product 190c is transferred from the conveyor 110c to the conveyor 150g without the product transfer unit 160g coming into contact with the product 190c. It will be appreciated that the return signal sent by the electronic inventory management device 180 indicating that the product 190c is to be transferred from the conveyor 110c to the conveyor 110f may be sent to directly the product transfer unit 160g instead of to the product detection unit 170g, which in turn sends a signal to the product transfer unit 160g.

After being diverted from the first conveyor 110c onto the transfer conveyor 150g, the product 190c travels on the surface of the transfer conveyor 150g toward the second conveyor 110f in the direction indicated by the arrow in FIG. 2B. When the product 190c reaches the product advancement surface 120f of the second conveyor 110f via the transfer conveyor 150g, the transfer of the product 190c from conveyor 110c to conveyor 110f is complete, and the product advancement surface 120f of the second conveyor 110f carries the product 190c in a direction indicated by the arrows in FIG. 2C, which is opposite to the direction the product 190c was traveling on the conveyor 110c. As discussed above, while FIG. 2A show and describe movement of the transfer conveyor 150g in one direction (i.e., from conveyor 110c to conveyor 110f), it will be appreciated that the transfer conveyor may be bidirectional, such that the product transfer unit 160g (or a separate additional product transfer unit) may cause a product traveling on the second conveyor 110f to be transferred to the first conveyor 110c.

The systems and methods described herein advantageously include multiple conveyors and as such have numerous inputs and outputs, but provide for multiple transfer points between the product advancement surfaces of the conveyors, such that numerous products may be moved along the product advancement surfaces of the conveyors without being limited by a bottleneck effect associated with conventional merge and sort systems, thereby providing a highly efficient and higher throughput system as compared to conventional systems and resulting in significant time and cost savings for sorting facility operators.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A conveyor system for sorting products, the system comprising:
   first product conveyors vertically stacked relative to one another and each having a product advancement surface configured to support the products thereon and to move with the products thereon in at least a first direction;
   second product conveyors vertically stacked relative to one another and each having a product advancement surface configured to support the products thereon and to move with the products thereon in at least a second direction different from the first direction; and transfer conveyors located between and connecting the first and second product conveyors, the transfer conveyors each having a product advancement surface configured to support the products thereon and to permit transfer of the products supported thereon between the first product conveyors and the second product conveyors;

wherein at least one of the first product conveyors is connected by a plurality of transfer conveyors to a plurality of the second product conveyors to permit transfer of the products from the product advancement surface of the at least one of the first product conveyors onto the product advancement surface of at least one of the transfer conveyors and from the product advancement surface of the at least one of the transfer conveyors onto the product advancement surface of any one of the plurality of the second product conveyors.

2. The system of claim 1, wherein the product advancement surface of each of the first product conveyors is configured to move at least in part in an upward direction, and wherein the product advancement surface of each of the second product conveyors is configured to move at least in part in a downward direction.

3. The system of claim 2, wherein a portion of the product advancement surface of each of the first and second conveyors is configured to move in a horizontal direction.

4. The system of claim 3, wherein the transfer conveyors are positioned to connect the first conveyors with the second conveyors at the portion of each of the first and second conveyors where the product advancement surface is configured to move in the horizontal direction.

5. The system of claim 1, wherein at least one of the transfer conveyors is oriented in a direction perpendicular to the product advancement surface of each of the first and second product conveyors connected by the at least one of the transfer conveyors.

6. The system of claim 1, wherein the product advancement surface of each of the first and second product conveyors includes a series of independently movable conveyor surfaces, at least one of the independently movable conveyor surfaces being configured to stop while at least another one of the independently movable conveyor sections is permitted to move.

7. The system of claim 1, wherein each of the transfer conveyors is configured to be movable while the product advancement surface of at least one of the first and second product conveyors is stopped and while at least another one of the transfer conveyors is stopped.

8. The system of claim 1, wherein the product advancement surface of each of the first product conveyors includes a plurality of points where a direction of the product advancement surface deviates relative to the first direction; and wherein the product advancement surface of each of the second product conveyors includes a plurality of points where a direction of the product advancement surface deviates relative to the second direction.

9. The system of claim 1, wherein at least one of the transfer conveyors overlies at least another one of the transfer conveyors.

10. The system of claim 1, wherein at least a portion of the product advancement surface of at least one of the first product conveyors is parallel to at least a portion of the product advancement surface of at least one of the second product conveyors.

11. The system of claim 1, further comprising product transfer units, each of the product transfer units being positioned at a respective one of the transfer conveyors and configured to transfer the products traveling on the product advancement surface of the at least one of the first product conveyors onto the product advancement surface of the at least one of the transfer conveyors.

12. A method of sorting products, the method comprising:
providing first product conveyors vertically stacked relative to one another and each having a product advancement surface configured to support the products thereon and to move with the products thereon in at least a first direction;

providing a second product conveyors vertically stacked relative to one another and each having a product advancement surface configured to support the products thereon and to move with the products thereon in at least a second direction different from the first direction;

providing transfer conveyors located between and connecting the first and second product conveyors, the transfer conveyors each having a product advancement surface configured to support the products thereon and to permit transfer of the products supported thereon between the first product conveyors and the second product conveyors; and connecting at least one of the first product conveyors by a plurality of transfer conveyors to a plurality of the second product conveyors to permit transfer of the products from the product advancement surface of the at least one of the first product conveyors onto the product advancement surface of at least one of the transfer conveyors and from the product advancement surface of the at least one of the transfer conveyors onto the product advancement surface of any one of the plurality of the second product conveyors.

13. The method of claim 12, further comprising moving the product advancement surface of each of the first product conveyors at least in part in an upward direction and moving the product advancement surface of each of the second product conveyors at least in part in a downward direction.

14. The method of claim 13, further comprising moving a portion of the product advancement surface of each of the first and second conveyors in a horizontal direction.

15. The method of claim 14, further comprising positioning the transfer conveyors to connect the first conveyors with the second conveyors at the portion of each of the first and second conveyors where the product advancement surface is moving in the horizontal direction.

16. The method of claim 15, further comprising orienting at least one of the transfer conveyors in a direction perpendicular to the product advancement surface of each of the first and second product conveyors connected by the at least one of the transfer conveyors.

17. The method of claim 12, further comprising providing the product advancement surface of each of the first and second product conveyors with a series of independently movable conveyor surfaces, and further comprising stopping at least one of the independently movable conveyor surfaces while moving at least another one of the independently movable conveyor sections.

18. The method of claim 12, further comprising moving each of the transfer conveyors while stopping the product advancement surface of at least one of the first and second product conveyors and while stopping at least another one of the transfer conveyors.

19. The method of claim 12, further comprising providing the product advancement surface of each of the first product conveyors with a plurality of points where a direction of the product advancement surface deviates relative to the first direction, and further comprising providing the product advancement surface of each of the second product conveyors with a plurality of points where a direction of the product advancement surface deviates relative to the second direction.

20. The method of claim 12, further comprising positioning at least one of the transfer conveyors to overlie at least another one of the transfer conveyors.

21. The method of claim 12, further comprising positioning at least a portion of the product advancement surface of at least one of the first product conveyors in parallel with at least a portion of the product advancement surface of at least one of the second product conveyors.

22. The method of claim 12, further comprising:
providing product transfer units, each of the product transfer units being positioned at a respective one of the transfer conveyors; and
transferring the products traveling on the product advancement surface of the at least one of the first product conveyors onto the product advancement surface of the at least one of the transfer conveyors.

* * * * *